Sept. 6, 1955 H. A. CRANSTON 2,717,211
BABY FOOD
Filed Nov. 3, 1952
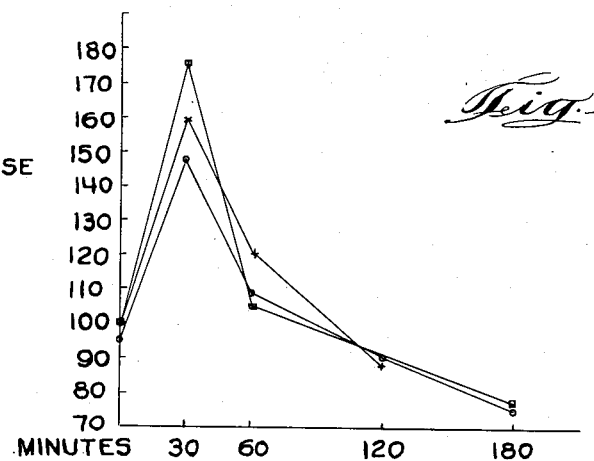
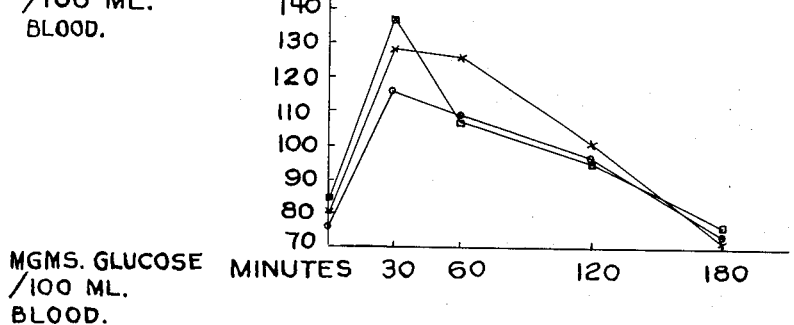
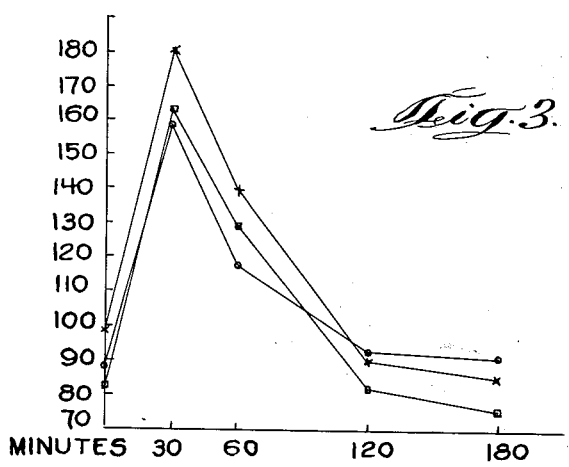
Inventor
Hoy A. Cranston
By
Brown Jackson Boettcher Dienner
Attorneys

# United States Patent Office 2,717,211
Patented Sept. 6, 1955

2,717,211

BABY FOOD

Hoy A. Cranston, Chicago, Ill., assignor to Carl S. Miner, Chicago, Ill.

Application November 3, 1952, Serial No. 318,421

15 Claims. (Cl. 99—54)

My invention relates to prepared food and food products for baby feeding.

This case is a continuation-in-part of my co-pending application, Serial No. 70,452, filed January 12, 1949 which is now abandoned.

It is a recognized fact, confirmed by my own observation, that breast-fed babies, when breast feeding is adequate in volume, usually thrive better than babies fed on any available substitute, such as presently marketed artificial baby foods. On the average, breast-fed babies grow faster, utilize their food better, and are not so subject to digestive disturbances. The incidence of colic in the case of babies fed on artificial food is significantly higher than in the case of babies which are breast-fed. Although extensive study and investigation has been devoted to the subject, this phenomenon of colic in the case of artificial or formula feeding has never had an adequate explanation, and no one has heretofore come forward with the remedy. This problem attracted my attention, and I undertook to seek out the cause, and, if possible, apply the necessary corrective. In brief, no one knew what there was in the artificial feeding that caused colic in infants, and no one knew how to overcome it. I proceeded to acquaint myself with the state of the art, and found substantially the following:

It has long been recognized that the milk produced by the female of each species of mammal is the best food for the newborn or infant of that particular species. Since there is considerable variation in the composition of the milk of the various species of mammals, the milk of one species is generally not entirely suitable to the requirements of the very young or infants of another species.

Thus human milk is recognized by pediatricians as being the ideal food for newborn babies or infants. However, nowadays, a large percentage of newborn babies are not breast-fed or not wholly breast-fed for the entire period in which breast-feeding would be optimum feeding. Breast-feeding in those cases is either wholly or partly substituted by bottle feeding on a so-called "formula," the basic ingredient of which is cow's milk. The cow's milk which is employed may be in any one of several forms, including certified raw milk, pasteurized milk, dry milk solids, condensed milk and evaporated milk.

Since the response of infants to cow's milk is generally less favorable than the response to human milk, a great deal of study and clinical investigation has been directed to the problem of modifying cow's milk in its various forms, so as to make it more nearly suitable for human infants. Efforts have also been made to produce synthetic substitutes for human milk. For example, so-called soy bean milk has been proposed as a substitute for human milk. This, like all other prior substitutes, has not proved wholly successful in practice.

A study of the procedures in general practice, for modification of the milk formulas, revealed the following pattern: Since cow's milk contains a higher percentage of protein (largely in the form of casein) than does human milk, the cow's milk is diluted with water to bring the protein level down to that suitable for the infant, i. e., somewhat in correspondence with the concentration of protein in human milk. However, this dilution results in a product the fat and carbohydrate content of which is below the level of the minimum caloric requirement of the infant. Therefore, the common practice is to add to the diluted milk one or more carbohydrates known or believed to be suitable for this purpose, so as to raise the formula to the required caloric level. Various sugars or other carbohydrates, such as dextrin or dextrin-maltose mixtures, have been advocated from time to time for use as the added carbohydrates, the great advantage claimed for compounds such as dextrin being that they are less susceptible to fermentation in the intestines.

But with all the study that has been given the matter of the formula, and with all the variants of fortifying carbohydrates, the high incidence of colic has persisted.

On an inspiration that I might discover something of value, I ran a test on carbohydrate utilization by infants. I ran the test first on breast-fed babies, and then on formula-fed babies. This inquiry consisted in testing the blood for its content of blood sugar at intervals over a period beginning with ingestion or immediately therebefore, and continuing for some time thereafter, to see at what rate blood sugar came into the blood stream, and at what rate it left the blood stream. This I inferred would be a rough measure of the rate of assimilation of the carbohydrates from the gut.

The readings or determination of blood sugar were then plotted in the accompanying graphs.

In the drawings hereto annexed:

Figure 1 shows graphs of the blood sugar content plotted as ordinates against time as the abscissae in the case of three normal infants which were breast-fed;

Figure 2 shows similar graphs of the blood sugar content plotted against time in the case of three normal infants which are fed on a cow's milk base formula fortified as above explained with carbohydrates in accordance with the prior art.

Figure 3 is a chart of graphs later to be explained.

From a comparison of the curves of Figures 1 and 2, it appears that in the breast-fed babies the blood sugar rises rapidly reaching a maximum in about thirty minutes, drops off rapidly in the next thirty minutes, and then drops at a reduced rate in the second and third hours.

The graph of Figure 2 shows that in the case of bottle-fed babies the rise in blood sugar during the first thirty minutes was at a relatively reduced rate, and did not reach as high a maximum as in the case of the breast-fed babies indicated in Figure 1. Furthermore, in Figure 2, the dropoff during the second thirty minutes was, on the average, not so rapid as in the case of the breast-fed babies. The concentration of blood sugar remained fairly high during the second thirty minutes, and continued so for another hour, finally dropping off to normal values at the end of the third hour after feeding.

Attention is called to the shapes of the curves. The averaged values for Figure 1 (breast-fed) are,

| | | |
|---|---|---|
| 0 min | 99 mgms | glucose/100 ml. blood. |
| 30 min | 161 mgms | Do. |
| 60 min | 111 mgms | Do. |
| 120 min | 89 mgms | Do. |
| 180 min | 75 mgms | Do. |

(The last value is the average of only two readings.)

The average values for Figure 2 (formula—without added phosphatase) are,

| | | |
|---|---|---|
| 0 min | 80 mgms | glucose/100 ml. blood. |
| 30 min | 129 mgms | Do. |
| 60 min | 115 mgms | Do. |
| 120 min | 98 mgms | Do. |
| 180 min | 74 mgms | Do. |

The curves of Figure 1 show a dropoff which is rapid at first and slower afterwards, whereas, the curves of Figure 2 show a dropoff which is slow at first and more rapid afterwards. The dropoff curves of Figure 1 are concave; those of Figure 2 are convex. These curves led me to believe that in the case of the feedings from which Figure 2 was made, the carbohydrates for some reason were being retained in the gut of the infant in sufficient amount and for so long a time as to give rise to fermentation.

I was aware that the utilization of carbohydrates by the human body involved the formation of intermediate compounds in which carbohydrates are combined with the phosphoric acid radical, and that the formation of these compounds is brought about by the action of an enzyme of the phosphatase class. It thereupon occurred to me that perhaps it was the case that the carbohydrates in mothers' milk were accompanied by sufficient phosphatase, and that the carbohydrates in the formula were not. Assay of 140 samples of human milk from 15 different individuals gave values of phosphatase ranging from 40 units per ml. to 750 units per ml. A unit of phosphatase activity as used herein refers exclusively to unit as defined in the assay method described subsequently. The average carbohydrate content of human milk, according to the literature and to analyses of the human milk samples on which the phosphatase assays were run, is 7.5%. Therefore, the phosphatase-carbohydrate ratio varies from approximately 500 to 10,000 units phosphatase per gram carbohydrate.

Thereupon I consider the cow's milk that entered into the formula employed in the feeding which resulted in the above graph of Figure 2. Cow's milk, it may be observed, is almost universally pasteurized milk, and the milk which entered into the formula that resulted in the graph of Figure 2 has been pasteurized. All milk sold in metropolitan areas is required to be pasteurized. In fact, pasteurization of milk for direct human consumption is the general rule. Thereupon it dawned upon me that the formula which I had used must have been practically devoid of phosphatase, since whatever quantity of phosphatase there originally may have been in the cow's milk had undoubtedly been destroyed during pasteurization. In fact, the commonly used test to determine the completeness of pasteurization is the completeness of the destruction of phosphatase in the milk. The well known "Scharer Test" for phosphatase used by dairies and health departments is employed to determine the completeness of pasteurization of milk. In other words, perfectly pasteurized milk has the phosphatase perfectly destroyed. It occurred to me therefore, from the above facts, and a study of the graphs of Figures 1 and 2, that breast-fed babies were receiving the proper phosphatase-carbohydrate ratio, while formula-fed babies were not, and hence unsatisfactory absorption and metabolism of the carbohydrate contents of the feeding was resulting. Undoubtedly, calves fed on cow's milk in the natural manner were also securing the right phosphatase-carbohydrate ratio for the calf. But when cow's milk to be fed to babies is diluted to reduce the ratio of protein (largely casein) to water to that prevailing in human milk, the carbohydrates were then too dilute. So pediatricians were fortifying this diluted milk with dextrin-maltose mixtures or the like. This dilution with water and fortification with carbohydrates throws the naturally occurring phosphatase-carbohydrate ratio completely out of balance. But worse than that, all of the phosphatase that the milk originally contained has been completely destroyed in the first place by pasteurization. Hence, in accordance with the feeding illustrated in Figure 2, the infants were getting doses of carbohydrates which they could not assimilate rapidly enough for lack of an enzyme, which probably was phosphatase, and, as a result, the carbohydrates remained so long in the gut that they were available for fermentation with the attendant risk of colic.

I thereupon set about to reconstruct in the formula the proper phosphatase-carbohydrate ratio which in mothers' milk is as a mean, about 2700 units of phosphatase per gram of carbohydrates.

This reconstruction I performed by first extracting phosphatase from mammary gland material as I shall later describe, and adding it to the formula in an amount which brought about approximately the natural phosphatase-carbohydrate ratio of mother's milk, and I tried the result on infants. This reconstructed or compensated formula was then tested by me in two different ways. First, I fed the formula to three infants and checked the blood sugar content as I had in the case of Figure 1 and Figure 2, and plotted the results in the graph of Figure 3.

The averaged values for Figure 3 (phosphatase including formula) are,

| | | |
|---|---|---|
| 0 min | 89 mgms | glucose/100 ml. blood. |
| 30 min | 170 mgms | Do. |
| 60 min | 130 mgms | Do. |
| 120 min | 85 mgms | Do. |
| 180 min | 81 mgms | Do. |

This showed at once that the compensated formula containing phosphatase in a sufficiently high ratio to carbohydrates gave substantially the same pattern as the blood sugar curve prevailing in the case of breast-fed babies charted in Figure 1. Upon feeding a formula with the phosphatase-carbohydrate ratio above described, as illustrated in Figure 3, the blood sugar rose rapidly to a maximum within thirty minutes, and dropped off rapidly in the next thirty minutes, and continued to drop but at a less rapid rate during the second hour, finally tapering off slowly to a minimum at the end of the third hour. In brief, the pattern of assimilation in Figure 3, which represents the result of feeding of a formula in accordance with my invention, shows a performance almost identical with that of breast-fed babies as recorded in the graph of Figure 1.

A second mode of checking the effectiveness of the compensated formula was employed, namely, clinical feeding of infants and noting the results against past case history of feeding on the prior art unbalanced formula.

In the clinical feeding and observation constituting this second method of testing, I found that infants that had suffered severely from colic on previous formulae of the prior art were able to accept my compensated formula without difficulty and the colic disappeared as by magic. The infants gained in weight, and showed every evidence of satisfactory assimilation, as I shall explain more in detail later. Apparently there is more rapid assimilation of the carbohydrates in the case of feeding the formula of my invention. In other words, the carbohydrates are taken out of the gut before they ferment, and colic does not develop.

The primary object of the invention is to provide an artificial food which will have substantially the acceptability and effectiveness of mother's milk in feeding infants, so that it may form a substantially complete and satisfactory substitute for mother's milk.

A further object is to provide one or more food components for construction of an infant feeding formula based on cow's milk, in the various forms in which it is produced and supplied to the market, in which formula the phosphatase-carbohydrate ratio is comparable to or substantially identical with that in mother's milk.

A further object is to provide a food or food component for babies based on pasteurized milk in its various forms in which the ratio of phosphatase to carbohydrates is sufficiently high to insure rapid assimilation of the carbohydrate component.

A further object of the invention is to provide a component or constituent of artificial baby food containing sufficient phosphatase that upon predetermined dilution with or addition to other baby food components or constituents, a satisfactory phosphatase-carbohydrate ratio will be secured.

A further object is to provide a new composition of matter, comprising phosphatase and carbohydrates in proper ratio for infant feeding when incorporated into a predetermined formula.

A further object of my invention is to provide a cow's milk base infant feeding formula which avoids colic.

The preferred form of the invention provides a cow's milk base formula which when fed to the infant results in absorption and metabolism of the carbohydrate content thereof in a manner substantially identical with that which prevails when the infant consumes human milk.

While the structure of the enzyme phosphatase is not known, authorities regard it generally as a protein which is manufactured in the animal organism. It may also have a vegetable origin. The concentrate obtained from the sources, and in the manner hereinafter described, will be found suitable to the practice of my invention.

I have found the following to be a satisfactory method for preparing phosphatase, or a concentrate thereof, for use in foods embodying my invention. Mammary gland tissue of cattle is finely divided and extracted with equal parts by volume of an alcohol (such as methyl, ethyl or isopropyl) and water for 24–48 hours at a temperature low enough to preserve the enzyme content of the gland tissue (e. g. 5° C.). At the end of the extraction period the fluid is clarified by centrifuging or filtering, and a volume of alcohol is added sufficient to increase the alcohol concentration of the resulting mixture to approximately 75 per cent. Precipitation of the enzyme in concentrated form results, and this precipitate is collected, washed with 95 per cent alcohol, and dried at a temperature not greater than 15° C. The phosphatase content of the dried precipitate prepared in this way ordinarily lies between 450,000 and 750,000 units per gram. This precipitate may be further purified, if desired, by repeated solution and precipitation. The phosphatase product may also be satisfactorily prepared by well known processes of adsorption and elution. The concentrate does not appear to deteriorate in the dry form in an airtight container, but appears to deteriorate when wet.

The method described herein by which the phosphatase activity of a material is assayed is an adaptation of the Scharer test. The Scharer test itself is used to determine whether or not cow's milk is adequately pasteurized and was designed to detect very small amounts of phosphatase activity. For materials (such as human milk, mammary glands or preparations thereof, or infant feeding formulas containing added phosphatase) which show relatively high phosphatase activity, the following adaptation of the Scharer test has been found to give reliable and reproducible results if followed carefully. Some variation in assay results appears to be inherent in the method. For example, a sample of dried, defatted, mammary gland tissue on which 18 assays were run in duplicate gave an average value of 75,000 units of phosphatase activity per gram, although the range of values was 67,000 to 87,000. This is characteristic of assay results found on a large number of samples over a considerable period of time.

PROCEDURE FOR DETERMINING PHOSPHATASE ACTIVITY

Prepare the following solutions:

(1) Buffer solution pH 9.7, 10.6 g. $Na_2CO_3$ anhyd., 8.4 g. $NaHCO_3$ in 1000 ml. of distilled water.

(2) $MgSO_4$ solution, 2.0 g. $MgSO_4$ anhyd. in 100 ml. distilled water.

(3) Substrate, 0.110 g. disodium phenyl phosphate in 100 ml. of buffer (1) solution. Make up fresh daily. Store dry reagent in refrigerator.

(4) Color developer, 0.040 g. 2,6-dibromoquinonechlorimide in 10 ml. of methanol (Gibbs reagent). Make up fresh daily. Store dry reagent in refrigerator.

(5) Solutions for assay:

A. One gram of sample to be assayed in 100 ml. of distilled water, mixed for 2 minutes in a high-speed blender. (If the solid sample does not disperse readily, mix it to a smooth paste with a small amount of water, make up to 100 ml. with distilled water and then mix in the blender.) In the case of soluble preparations, mixing in a blender is unnecessary.

B. Dilute X ml. of "A" plus 10 ml. of $MgSO_4$ solution to 100 ml. with distilled water. Use one-ml. aliquots for assay. Values of X corresponding to various ranges of potency are given in the following table:

| Expected Potency of Preparation | X |
|---|---|
| 50,000–150,000 units/gram | 1 |
| 10,000–50,000 units/gram | 2 |
| 2,000–10,000 units/gram | 10 |
| Less than 2,000 units/gram | 50 |

In taking aliquots of test "solutions" shake thoroughly immediately before removing each aliquot.

C. In the case of human milk it is advisable, because of the wide range of potency, to assay an unknown sample if possible at dilutions of both 1 to 5 and 1 to 50. Milk samples should be assayed immediately after they are taken as the phosphatase activity decreases on standing. If they cannot be assayed immediately, they should be kept frozen until the assay is run.

(6) Phenol solutions for standard curve:

A. Dissolve 1 g. C. P. phenol in 100 ml. water or in 0.1 N HCl.

B. Dilute 5 ml., 10 ml., and 20 ml. of this solution to 1000 ml. with distilled water. The resultant solutions contain 5, 10 and 20 micrograms of phenol per ml., respectively.

Assay procedure:

(a) Add 1 ml. of test solutions (5B) or (5C) and 5 ml. of substrate (3) to a large test tube, mix, and incubate for 1 hour in a water bath at 37.5±0.5° C. For the blank, incubate 5 ml. of substrate plus 1 ml. from a portion of test solution which has been in a boiling water bath 5 minutes.

(b) At the end of 1 hour place test tubes in boiling water for 5 minutes.

(c) Cool tubes to room temperature (25° C.).

(d) Add 0.15 ml. of Gibbs reagent (4) to each tube, mix, and allow color to develop for 15 minutes at room temperature (25° C.).

(e) Add 10 ml. of butyl alcohol to each tube and shake thoroughly to extract color.

(f) Cool tubes in an ice bath and centrifuge.

(g) Pour alcohol layer into 13 mm. cuvette tubes. Determine percent transmittance on a Coleman spectrophotometer No. 11 at wavelength 650 mu with a PC4 filter with the instrument adjusted so that the blank shows 100% transmittance.

(h) Calculate optical density. The quantity of phenol in micrograms per ml. is read from the standard curve.

Standard curve:

Incubate 1 ml. portions of distilled water (as a blank) and of phenol solutions containing 5, 10 and 20 micrograms of phenol per ml. with a 5 ml. of substrate at $37.5 \pm 0.5°$ C. for 1 hour. At the end of incubation period place tubes in boiling water bath for 5 minutes, then cool to room temperature. Add 0.15 ml. Gibbs reagent and allow color to develop for 15 minutes. Add 10 ml. butyl alcohol and extract color by shaking vigorously. Cool solutions in an ice bath, centrifuge and decant alcohol layer into cuvette tubes. Determine percent transmittance of phenol solutions on a Coleman spectrophotometer No. 11 at 650 mu with a PC4 filter with the instrument adjusted so that the blank shows 100% transmittance. Calculate optical density and draw standard curve by plotting micrograms of phenol against optical density.

Definition of unit:

Every microgram of phenol liberated, under the conditions set forth in this procedure, equals one unit of phosphatase activity. For example, a preparation which at a dilution of 1:1000 liberates 10 micrograms of phenol under the above conditions has a phosphatase activity of 10,000 units per gram.

In utilizing my invention for the production of compositions for infant feeding, normally I add a sufficient amount of phosphatase, so that by use of the resulting composition, the child will receive phosphatase in substantially the same proportion of phosphatase to carbohydrates as would be the case if it were efficiently breast-fed. Calculation of the necessary amounts ordinarily should be based on the phosphatase content of human milk, which normally lies between 40–750 units per ml., although if desired, the appropriate amount of phosphatase to be added to a particular combination of food ingredients may be determined by application of the blood sugar test described above.

Preferably, I incorporate the phosphatase enzyme concentrate in suitable amount with one or more of the conventional components of an infant's diet, so that by the addition of other readily available constituents as directed, a complete phosphatase-balanced formula is ensured. Carbohydrates are important constituents to which the phosphatase may be conveniently added. The carbohydrates most commonly used as components of infant diets are products prepared by partial starch conversion using acid or enzyme treatment, such product being mixtures, either liquid or solid, of dextrin, maltose and dextrose in various proportions.

Sugars, such as sucrose and dextrose, are normally less expensive than these partially converted starch products, and would find more extensive use were it not for the fact that in many infants their ingestion is particularly apt to lead to fermentation in the intestinal tract and the discomfort associated with the gas produced in this fermentation. I have found that when I add suitable amounts of phosphatase to a formula containing a sugar as its only added carbohydrate, intestinal fermentation is substantially eliminated.

Instead of incorporating the phosphatase concentrate with a carbohydrate component of an infant's diet, the enzyme may be incorporated with other components, such as dry milk solids. Likewise, prepared dry cereal foods for infants may be fortified with phosphatase.

In whatever type of food component the phosphatase is incorporated it is necessary to increase the proportion of phosphatase to thereby allow for the additional carbohydrate content of the milk to which the component will be added. In other words, sufficient phosphatase must be added so that when the component containing the phosphatase is added to milk, enough phosphatase will be present to maintain the proper ratio of phosphatase to total carbohydrate in the final formula. The desideratum is to have a suitable phosphatase-carbohydrate ratio in the feeding which the infant receives.

The following specific examples will serve further to illustrate my present invention and make known the presently preferred embodiments thereof. They are based on the diet requirements of infants under three months of age.

*Example 1*

To 100 parts of dehydrated corn syrup is added, with thorough mixing, 1.3 parts of dry phosphatase concentrate assaying 450,000 units per gram. The thus constituted product when used in normal quantity for the preparation of an infant's formula will be sufficient to furnish the phosphatase activity normally present in an equal volume of human milk. Thus, one part of such a formula will, with respect to its phosphatase activity, be equivalent to one part of human milk.

*Example 2*

To an enzyme-converted starch product comprising approximately equal parts of maltose and dextrin, dry ground phosphatase concentrate, as above prepared, is added an amount of phosphatase concentrate sufficient to give a blend containing about 6000 units per gram of carbohydrates. The materials are thoroughly mixed. The composite product, when used in the usual concentration in preparing an infant's formula will provide sufficient phosphatase activity to equal that provided in an equal quantity of human milk.

*Example 3*

Cow's milk is pasteurized according to one of the established procedures, and then evaporated to the proper consistency for drying on a vacuum drum drier. After being so evaporated and prior to drying, phosphatase concentrate assaying 525,000 units per gram is added thereto in an amount equivalent to 1.0 per cent by weight of the milk solids, and the mixture is then dried on a vacuum drier at a temperature not exceeding 37° C. Such drying conditions result in efficient drying of the milk-phosphatase mixture without destruction or inactivation of the enzyme. The resulting dry product is suitable for use in preparing an infant's formula and for other infant food purposes, wherein the carbohydrates are supplied in the ratio above indicated, i. e., approximately 500 to 10,000 units of phosphatase per gram of carbohydrate material.

*Example 4*

Cow's milk is pasteurized and evaporated or concentrated. From one to ten per cent of the total batch is set aside, and the remainder is then dried at ordinary atmospheric pressure in accordance with suitable drying procedure and in suitable equipment (e. g., spray drying). The full requirement of phosphatase for the entire batch is added to the small fraction of concentrated milk previously set aside, and this is then dried under vacuum conditions, such, for example, as those set forth in Example 3. In order to prevent segregation of the two fractions, this vacuum drying operation is so carried out as to produce particles of substantially the same size and shape as those produced by drying the main portion of the batch. The two lots are then combined and thoroughly mixed. This procedure has the advantage of largely avoiding the somewhat more expensive procedure of drying in vacuum the entire batch. The resulting product consists of a dry phosphatase-milk product wherein the phosphatase is uniformly and permanently distributed. In preparing the formula for feeding the aforesaid phosphatase-carbohydrate ratio of approximately 500 to 10,000 units per gram of carbohydrate is observed.

*Example 5*

A phosphatase-containing infant food of the fortified cereal type may be prepared by cooking cereals, together with suitable quantities of minerals, vitamins and other fortifying ingredients. From one to ten percent of the cooked batch is separated. To this is added 0.5 per cent, based on the dry weight of the entire batch, of phosphatase concentrate, and the mixture is dried at low temperature under suitable conditions of vacuum so as to prevent destruction or inactivation of the phosphatase content. The drying conditions are so controlled as to produce a dried product, the particles of which are substantially similar in respect to size, shape and apparent specific gravity to the particles produced by the drying of the main batch at atmospheric pressure. Thus, the drying may be carried out on rolls, in which case the rate of revolution of the rolls, the rate of feed, the temperature of the rolls, etc., are properly controlled to give the desired product.

*Example 6*

A complete formula for infant feeding may be prepared in the following manner. Fourteen ounces of pasteurized milk is diluted with ten ounces of water. To the diluted milk is added one ounce of the phosphatase-fortified dextrin-maltose mixture of Example 2.

The water content is not critical, but dilution should be governed by the factors of age, size and caloric requirements, as is well understood by pediatricians.

Obviously, numerous other phosphatase-charged products may be similarly prepared. For example, products may be produced wherein mixtures of carbohydrates, cereals and dried milk solids are compounded and charged with phosphatase in appropriate amount.

Clinical tests of the feeding of phosphatase concentrate have shown that it has no adverse or untoward effect when fed to infants in quantities far exceeding those which would ordinarily be used in practice. Hence, it is to be observed that the phosphatase-carbohydrate ratio above stated is not critical. The stated ratio may be exceeded without adverse effects.

It is apparent from Figures 1 and 3 that the blood sugar curves of breast-fed infants and those of bottle-fed infants to which added phosphatase was supplied through the formula rectification of my invention are practically identical. On the other hand, the blood sugar curves for the bottle-fed babies not supplied with added phosphatase are radically different. The relatively low blood sugar values during the first thirty minutes in Figure 2 indicate a sub-normal rate of absorption, which is frequently associated with colic and other untoward effects.

That the addition of phosphatase actually does act to inhibit intestinal fermentation and resultant colic is shown by the following clinical tests:

*Case 1.*—Baby H. H. White. Female. Age 3 weeks. Breast-fed during first two weeks. No digestive difficulties. Weight gain normal, 15 ounces. At the end of the second week it became necessary to supplement the breast-feeding with an artificial formula based on cow's milk. The baby immediately manifested symptoms of colic and intestinal fermentation, and there was no weight gain during the following week. At this time a quantity of phosphatase concentrate calculated to be equal to the amount present in an equal quantity of breast milk was added to the artificial formula, which was not altered in any other manner. After the second feeding of the enzyme-reinforced formula, the colic symptoms disappeared, and after one week, the baby had gained 10 ounces. There was no recurrence of colic or intestinal fermentation after an additional period of four weeks during which the phosphatase reinforcement was continued.

*Case 2.*—Baby W. G. White. Male. Age 23 days. The baby had been artificially fed from birth. Various types of formulas had been tried without changing the clinical picture. The baby was fretful, seldom sleeping more than 2 hours at one time. Intestinal fermentation and colic were marked. When first seen the baby was dehydrated and markedly undernourished, having gained only 10 ounces since birth. An amount of phosphatase concentrate calculated to be equivalent to the amount present in human milk was added to an otherwise unchanged artificial feeding which had previously been fed with unsatisfactory results. After twenty-four hours the baby showed no signs of colic and was sleeping normally. Seven days later the baby had gained 25 ounces in weight with no return of the previous evidence of pain and wakefulness. The following 3 weeks showed a normal weight gain and behavior.

These two cases are typical of the results obtained with eleven infants which were furnished diets in which the enzyme phosphatase was added in proper ratio to carbohydrates, with no other change in the amount, quantity or frequency of the artificial feedings which had been inadequate to produce normal weight gain and comfort. All showed immediate improvement, and this improvement was sustained, with no return of any symptoms.

It should be pointed out that all eleven infants were "feeding problem" babies, and the immediate response to the inclusion of the proper ratio of the enzyme in the food precludes the assumption that these babies were in a transition period from one food to another.

The determination of the proper amount of phosphatase to be added to a formula for an individual infant may be checked by the blood sugar test above described. If the inclusion of phosphatase or fortification with phosphatase to bring the phosphatase-carbohydrate ratio within the 500 to 10,000 units of phosphatase per gram of carbohydrate does not produce a curve approximating the mother's milk feeding curve of Figure 1, the ratio should be raised to find the value of the ratio at which the mother's milk feeding curve will be obtained. When the proper individual ratio is thus obtained that value should be continued.

Ordinarily, an individual test is not necessary, for while my clinical experience is limited, it gives strong indication that a mean value of the ratio at about 2700 units of phosphatase per gram of carbohydrates supplies the need and an excess of phosphatase appears to cause no harm and create no disturbance in the digestion.

I claim:

1. A baby food component comprising a mixture of whole milk solids produced by heating and evaporating whole milk, and concentrated, pathogen-free mammary gland phosphatase.

2. A baby food component comprising a mixture of non-fat milk solids obtained from milk which has been heat treated sufficiently to destroy the enzymes normally contained therein and concentrated, pathogen-free mammary gland phosphatase.

3. A baby food component comprising a mixture of milk solids obtained from milk which has been heat treated sufficiently to destroy the enzymes normally contained therein, carbohydrate, and concentrated, pathogen-free mammary gland phosphatase.

4. A baby food component comprising a mixture of carbohydrate substantially void of phosphatase, and concentrated, pathogen-free mammary gland phosphatase.

5. Baby food component the essentials of which are concentrated, pathogen-free mammary gland phosphatase and dry carbohydrate in the ratio of substantially 800 to 15,000 units of phosphatase per gram of dry carbohydrate.

6. Baby food component comprising a dry mixture of milk solids, one or more added carbohydrates and concentrated, pathogen-free mammary gland phosphatase, the phosphatase being present substantially in the ratio of 500 to 10,000 units per gram of total carbohydrate in the mixture.

7. Artificial baby food component comprising essentially dextrin, maltose and concentrated, dry, pathogen-free mammary gland phosphatase, the phosphatase being present substantially in the ratio of 800 to 15,000 units per gram of carbohydrate in the mixture.

8. Artificial baby food component comprising essentially dried corn syrup and concentrated, pathogen-free mammary gland phosphatase, the phosphatase being present substantially in the ratio of 800 to 15,000 units per gram of carbohydrate in the mixture.

9. Artificial baby food composition comprising essentially dry precooked cereal and concentrated, pathogen-free mammary gland phosphatase.

10. Artificial baby food composition in dry form comprising a food sugar and concentrated, pathogen-free mammary gland phosphatase, the phosphatase being present substantially in the ratio of 800 to 15,000 units per gram of carbohydrate in the mixture.

11. Artificial baby food composition comprising dilute pasteurized milk, added carbohydrates and concentrated, pathogen-free mammary gland phosphatase, the phosphatase being present substantially in the ratio of 500 to 10,000 units per gram of total carbohydrate in the mixture.

12. The process of preparing infants' food which comprises diluting cow's milk, fortifying the diluted milk with carbohydrates and adding mammary gland phosphatase, the phosphatase being present substantially in the ratio of 500 to 10,000 units per gram of total carbohydrate in the mixture.

13. Process of preparing infants' food which comprises diluting pasteurized cow's milk, fortifying the diluted milk with carbohydrate and adding concentrated, pathogen-free mammary gland phosphatase to produce a phosphatase to carbohydrate ratio of not substantially less than 500 to 10,000 units of phosphatase per gram of carbohydrates.

14. A process for the manufacture of phosphatase rectified food component which comprises evaporating a major volume of milk under temperature conditions adapted to destroy enzymes therein, adding concentrated, pathogen-free mammary gland phosphatase to a minor volume of milk, evaporating the minor volume under temperature conditions adapted to preserve enzymes present, and then mixing the two evaporated volumes in the dry state, the amount of said added phosphatase being sufficient to produce a phosphatase to carbohydrate ratio of not substantially less than 1,300 to 29,000 units of phosphatase per gram of carbohydrate in the last said dry mixture.

15. The process for the manufacture of phosphatase corrected food materials which comprises preparing a batch of food material in liquid form, said batch comprising carbohydrates, separating the batch into a major fraction and a minor fraction, drying the major fraction under temperature conditions which destroy enzymes, adding concentrated, pathogen-free mammary gland phosphatase to the minor fraction, drying the minor fraction under conditions which preserve enzyme activity, both drying operations forming particles of substantially the same size and shape, and then mixing the particles into a substantially uniform non-segregating mass.

References Cited in the file of this patent

FOREIGN PATENTS

| | | |
|---|---|---|
| 2,682 | Great Britain | Feb. 3, 1910 |
| 394,182 | Great Britain | June 22, 1933 |

OTHER REFERENCES

J. B. Sumner & G. F. Somers: Chemistry and Methods of Enzymes, published 1943 by Academic Press, Inc., New York, pages 58 to 65.

Journal of Dairy Science, vol. 29, No. 11, Nov. 1946, pages 737–749.

Journal of Dairy Science, vol. 24, No. 5, May 1941, pages 369 to 381.